United States Patent [19]

Haynes

[11] Patent Number: 5,154,330
[45] Date of Patent: Oct. 13, 1992

[54] SHOPPING LIST HOLDER

[76] Inventor: William C. Haynes, R.F.D. 530, Vineyard Haven, Mass. 02568

[21] Appl. No.: 545,865

[22] Filed: Jun. 29, 1990

[51] Int. Cl.⁵ ............................................. B60R 7/00
[52] U.S. Cl. ................................. 224/277; 211/45; 248/227; 40/657; 40/658
[58] Field of Search .......... 224/42.41, 275, 277, 224/42.45 R, 276; 211/45, 47; 206/38, 818; 40/308, 647, 657, 658; 248/441.1, 440.1, 227, 302, 303; 280/727, 33.992; 281/44, 45; 108/42, 152; D19/88; D8/395

[56] References Cited

U.S. PATENT DOCUMENTS

| | | | |
|---|---|---|---|
| 2,523,590 | 9/1950 | Potter et al. | 224/277 X |
| 3,488,025 | 1/1970 | Rowland | 248/304 X |
| 3,539,204 | 11/1970 | Keller | 280/33.992 X |
| 3,881,267 | 5/1975 | Hicks | 40/308 |
| 4,034,539 | 7/1977 | Economy | 40/308 |
| 4,100,684 | 7/1978 | Berger | 206/818 X |
| 4,156,318 | 5/1979 | Economy | 40/308 |
| 4,274,567 | 6/1981 | Sawyer | 280/33.992 X |
| 4,356,651 | 11/1982 | Barlow | 40/308 |
| 4,423,888 | 1/1984 | Addison | 40/308 X |
| 4,496,058 | 1/1985 | Harris | 211/86 |
| 4,512,504 | 4/1985 | Owlett | 224/277 |
| 4,685,701 | 8/1987 | Amundson et al. | 224/277 X |
| 4,848,117 | 7/1989 | Welborn | 40/308 |
| 4,858,353 | 8/1989 | Krebs | 40/308 |
| 4,976,385 | 12/1990 | Matsumoto | 224/42.42 |

FOREIGN PATENT DOCUMENTS 8908040  9/1989  PCT Int'l Appl. ............ 280/33.992

Primary Examiner—Henry J. Recla
Assistant Examiner—Glenn T. Barrett
Attorney, Agent, or Firm—William B. Ritchie

[57] ABSTRACT

A shopping list holder having a novel method of fastening the holder on a vertical rod of a child seat on a standard shopping cart. The method of fastening permits the list holder to be positioned at two distinct angles of repose. The angle of reponse that is more accessible by the user is selected merely by choosing whether to fasten the list holder around a vertical rod from the right to left or from left to right. The use of magnetic strips enables the holder to be stored on a refrigerator or other metal surface to keep the list holder readily available for use at home.

14 Claims, 5 Drawing Sheets

SHOPPING LIST HOLDER

BACKGROUND OF THE INVENTION

1. Field of the Invention

The invention relates to shopping cart accessories.

2. Description of the Related Art

The use of a shopping list while in the supermarket is almost universal. Observation of shoppers pushing their carts at any point in time will reveal the use of shopping lists on all kinds of paper from napkins to the use of the periphery of coupons, stuffed into shirt pockets, pocketbooks, trouser pockets. While such lists may be well organized at home, when the shopper gets into the store, there is no convenient place to place the list and to check off each item as it is placed in the shopping cart. Further, discount coupons which are also used by a substantial percentage of the grocery shopping public further exacerbates the problem of paper handling while trying to push the cart.

Recognizing a part of the problem, a number of inventions have been directed to shopping cart organizers and list holders.

Krebs U.S. Pat. No. 4,858,353, issued on Aug. 22, 1989, discloses a grocery shopper organizer that releasibly fastens to the horizontal bar of the child seat or along one of the horizontal side bars of the shopping cart. The design has provisions for carrying a calculator, substantial space devoted to storing coupons and a small area for shopping lists as well as a clip to hold a pen or pencil. Due to its size and the mechanism that holds the device to the cart, it is not readily transportable to and from the grocery store and is inconvenient to store at home.

U.S. Pat. No. 4,034,539 and continuation-in-part issued to Economy, U.S. Pat. No. 4,156,318, discloses a shopping cart organizer that is suspended between the front and rear horizontal bars of the child seat. This device is meant to stay with the shopping cart.

Welborn et al. U.S. Pat. No. 4,848,117, discloses another shopping cart list holder that clamps to the shopping cart handle. To install, the shopper must use wing nuts to tighten the device in place.

Harris et al., U.S. Pat. No. 4,496,058, discloses still another shopping cart organizer with two separate writing compartments attached to the shopping cart handle with a spring clip arrangement.

A shopping list holder that can be kept in a convenient location for adding items to the list; can be comfortably carried from the home to the store; can quickly be attached to the shopping cart; and can provide a stable, easily accessible writing surface is not found in the prior art.

SUMMARY OF THE INVENTION

It is an object of the invention to provide a shopping list holder that can be stored on the refrigerator or other metal surface to permit the shopper easy accessibility to add items to the list prior to going to the store.

It is another object of the invention to provide a shopping list holder that can be attached to the front wall of the child seat in a shopping cart without interrupting the usefulness of the seat for holding small or breakable shopping items.

It is still another object of the invention to provide a shopping list holder that is small enough to carry in a pocket book or trouser pocket yet of sufficient size to hold a customary shopping list.

It is still a further object of the invention to provide a shopping list holder that provides a stable writing easily accessible writing surface.

It is another object of the invention to provide a shopping list holder that provides a point of attachment for a pen or pencil.

It is a final object of the invention to provide a shopping list holder that adjusts to two different writing/reading positions.

The invention is a shopping list holder adapted for support on a shopping cart child seat. The child seat is of the type having at least one wall with an upper horizontal rod supported by a plurality of vertical rods. A substantially flat member of rectangular shape having top and bottom surfaces, front and rear edges is provided. Fastener means, attached to said flat member adjacent to the front edge, is provided for releasibly attaching to one vertical rod of said wall. Fastener means is also for enabling said flat member to be supported on the upper horizontal bar in a position suitable for comfortably accessing the shopping list.

DETAILED DESCRIPTION OF THE INVENTION

Figure 1:
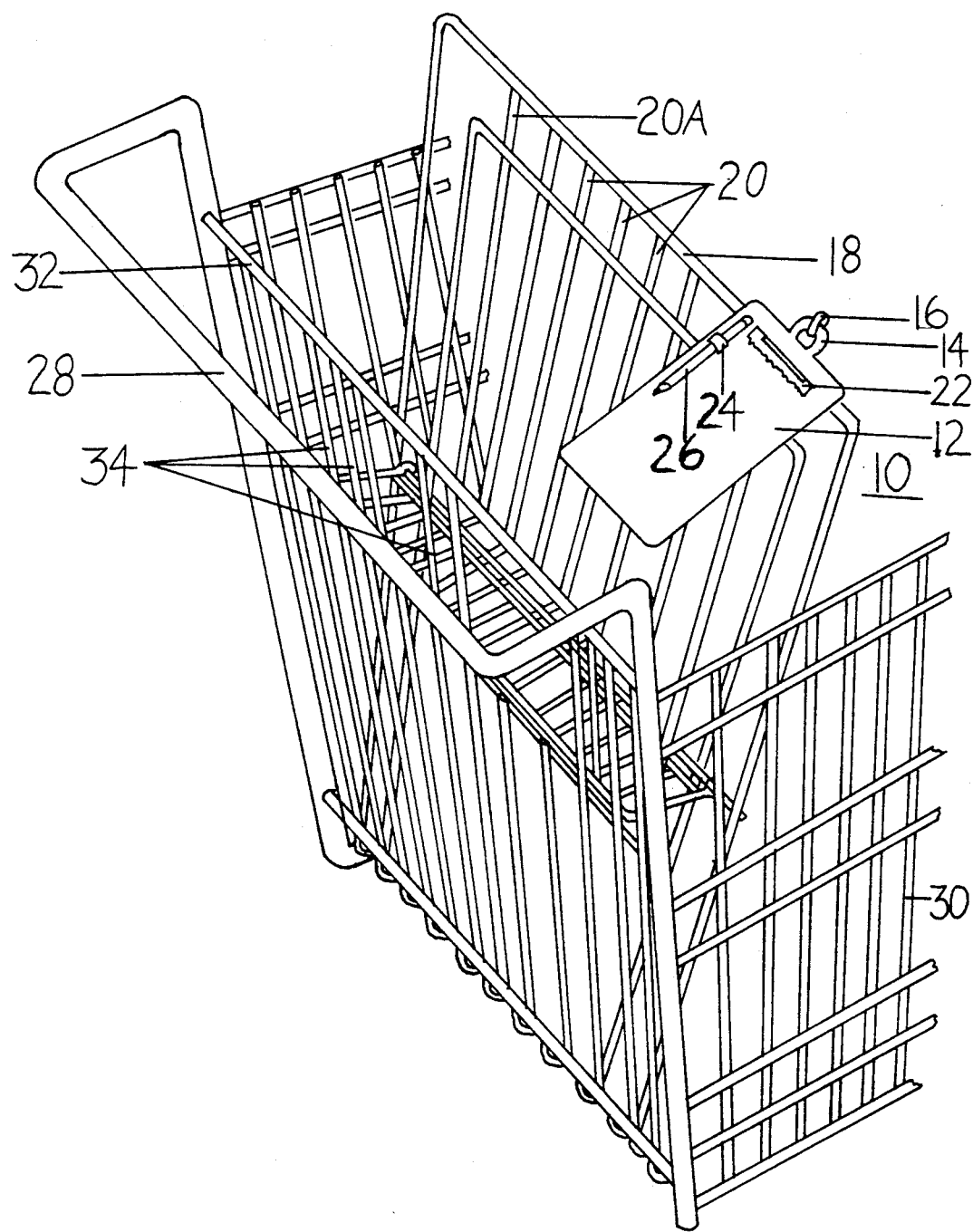
FIG. 1 illustrates a perspective view of a shopping cart showing the shopping list holder attached according to the invention.

FIG. 1 illustrates a perspective view of a shopping cart showing the shopping list holder attached according to the invention. Invention 10 is shown attached in its preferred position, that is, anchored to one of the vertical rods 20 of the front wall of the child seat of standard shopping cart 30. Board member 12 is supported by horizontal rod 18 at an angle that is comfortable to see and write upon. A shopping list (not shown) is held in place by clip 22. Clip 22 can also be used to hold coupons. To check off each item as it is purchased, the operator would use writing instrument 26 which is held in place by clip 24 while not being used. Swivel 14 attaches hook 16 to board 12. Hook 16 is fastened behind a single vertical rod 20. The weight of board 12 causes hook 16 to be firmly urged against rod 20 thus holding invention 10 conveniently in place for writing or viewing the shopping list.

In an alternative embodiment, invention 10 can be attached to one front vertical rod 34, with board member 12 supported by front horizontal bar 32. In this position, board member 12 is beneath handle 28 so that it is still possible to use board member 12 as a writing/viewing surface.

As shown, invention 10 is convenient for right handed people, with the left hand free to push shopping cart 30 via handle 28. However, invention 10 could also be attached to vertical rod 20a which be more comfortable for left-handed shoppers.

Figure 2:
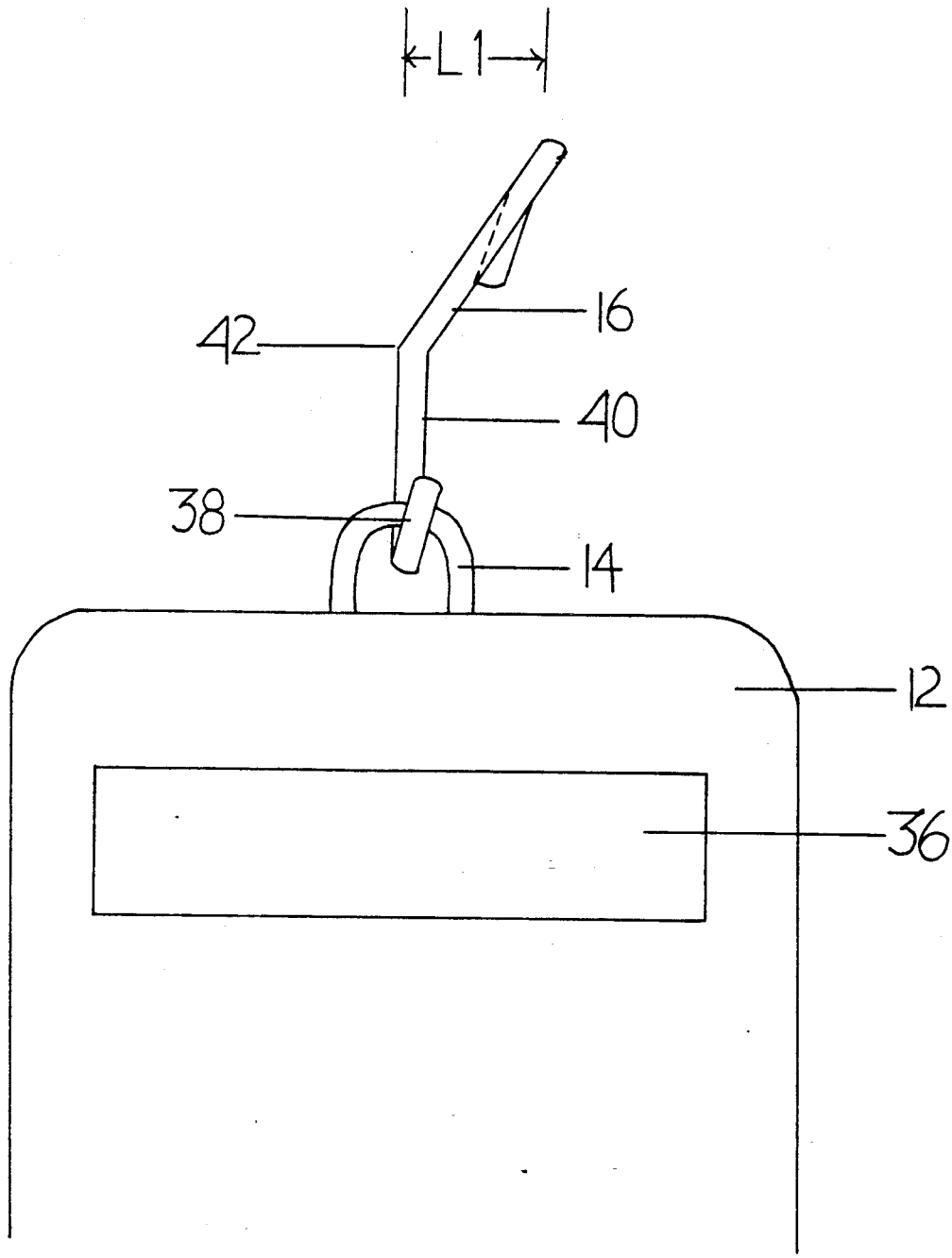
FIG. 2 illustrates a fragmentary bottom view of the invention showing the front edge which attaches to the shopping cart.

FIG. 2 illustrates a fragmentary bottom view of the invention showing the front edge which attaches to the shopping cart. On the bottom surface of board member 12, at least one magnetic strip 36 is attached. Magnetic strip 36 is preferably of the type that has adhesive on one side which enables the strip to be fastened to most surfaces. The dimensions are not critical as long as sufficient magnetic material is present to hold the weight of invention 10 in place on a refrigerator or other metal surface. For example, a 4.5 ounce unit should have at least 14 inches of ¾ inch wide magnetic tape. The preferable way of applying the tape is to have one strip approximately ½ inch from the front edge of board 12. This enables strip 36 to help keep board member 12 in stable position when supported by horizontal bar 18.

Hook 16 is attached to swivel eye 14 with the opening section of hook 16 facing the top surface of board 12. Hook 16 must be free to swivel to permit attachment to vertical rod 20. The bend in shank 40 occurring at point 42 yields offset L1.

Figure 3:
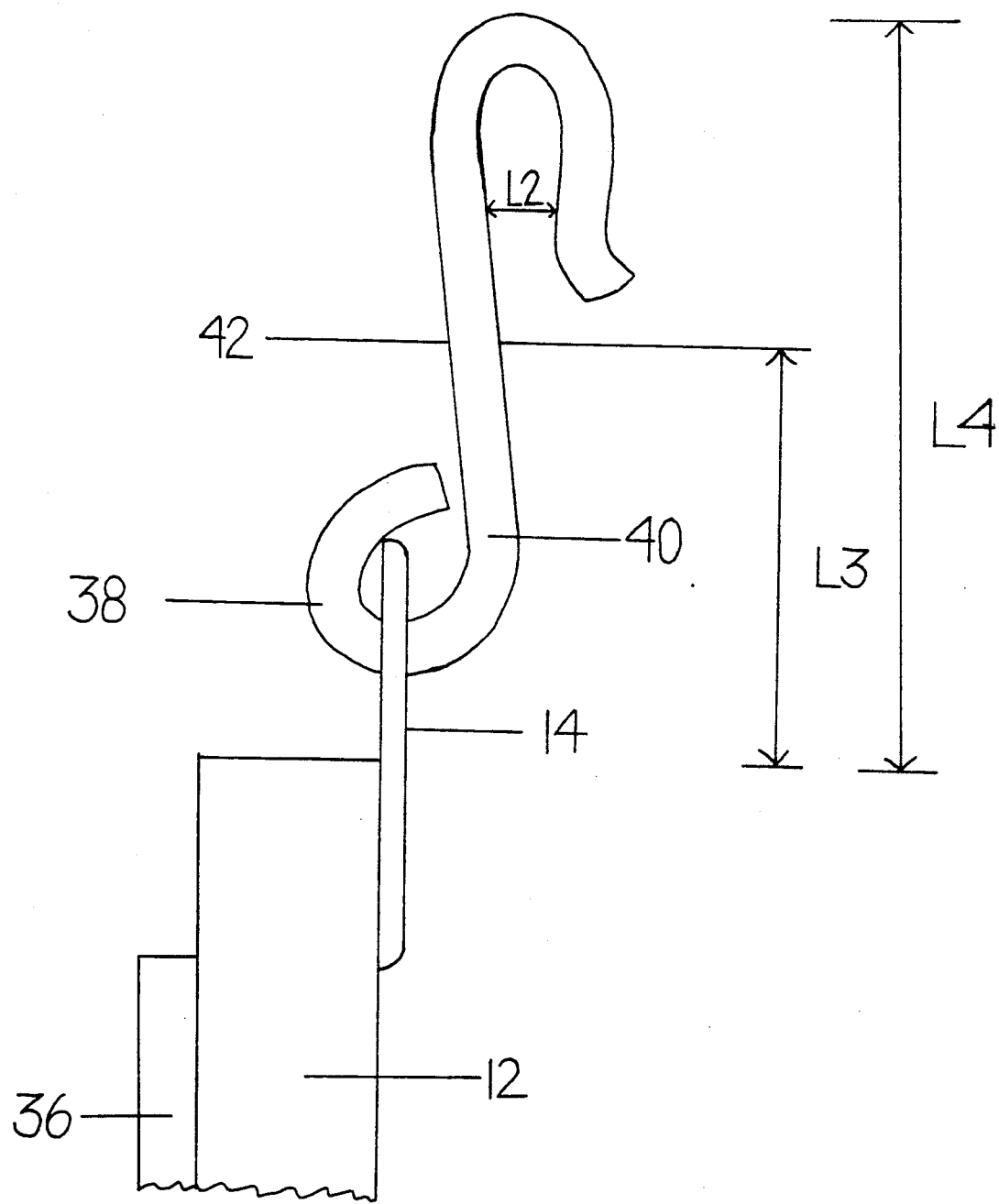
FIG. 3 illustrates an exploded side view of the fastening means according to the invention.

Offset L1 is preferably ¼ inch when using the representative measurements provided in discussing FIG. 3. Offset L1 enables board member 12 to have two distinct angles of repose when attached to shopping cart 30 depending on how hook 16 is attached to vertical rod 20.

FIG. 3 illustrates an exploded side view of the fastening means according to the invention. The following discussion is based on invention 10 having a board member of approximately 4½ inches by 8¼ inches. This size is preferable for convenience of carrying to and from the store while still be large enough to be useful for holding the shopping list and functioning as a writing surface.

Eye 14 must be of sufficient strength to permit the use of board member 12 as a writing surface without deforming under the writing pressure of the user. A standard clip board with a conventional clip having an eye for hanging the board is suitable for use as swivel eye 14. The dimensions of the examples provided herein utilized an adapted standard clip board. However, in the preferred embodiment, swivel eye 14 and clip 22 would be separate elements. This would permit the use of lower profile clips and make invention 10 more transportable.

Note that the fastening mechanism when not in use does not extend below the bottom surface of board member 12. Fastening arrangements which are designed to attach to the bottom surface of shopping list holders prevent storing the device on a refrigerator or other convenient metal surface such as a stove. In this fashion, the shopping list holder is always readily available to add or subtract items to the shopping list.

In the following example, shank 40 of hook 16 is made from 1/16 inch rod. Other materials could also be used, including hard plastics such as nylon. Total length L4 should range between 1½ and 1¼ inches. Point of bend 42 should occur at L3 which is approximately ½ L4 or about ¾ inches from the front edge of board 12. The dimension of L2 is preferably ⅜ inches.

Figure 4:
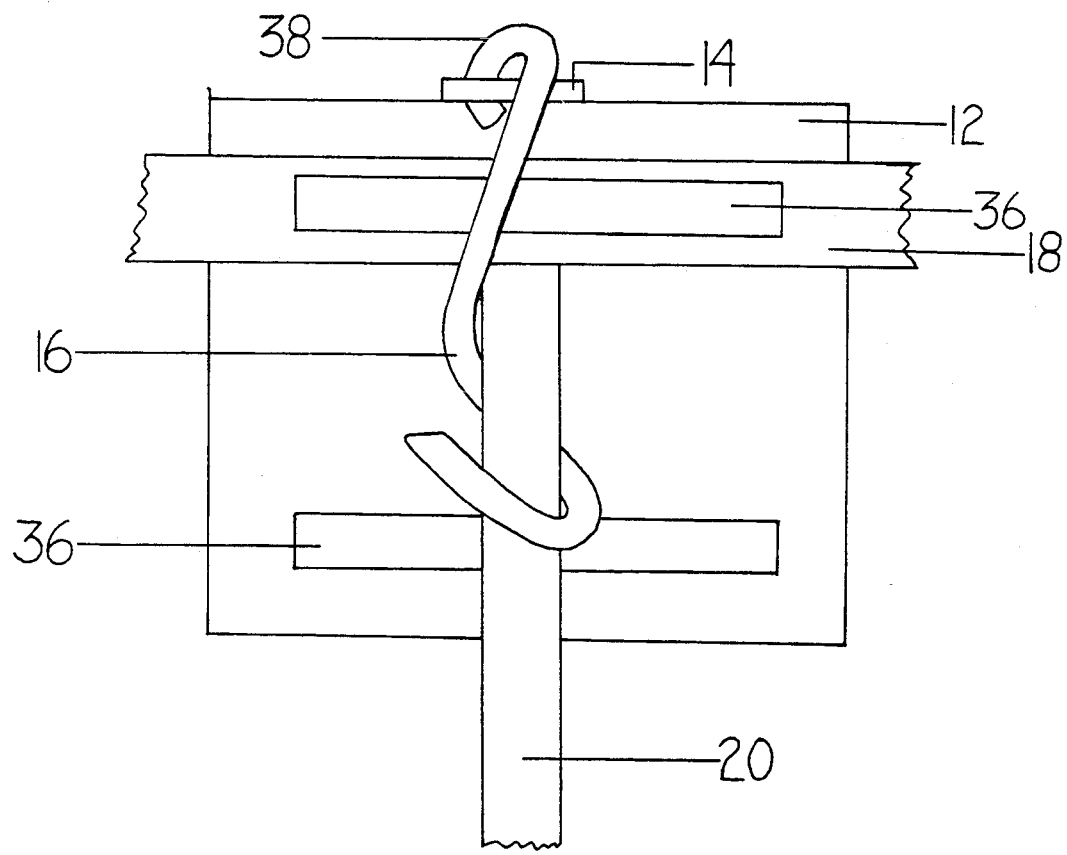
FIG. 4 illustrates an exploded front view of the fastening means attached to the shopping cart.

FIG. 4 illustrates an exploded front view of the fastening mechanism attached to the shopping cart. As shown, hook 16 is fastened around vertical rod 20 from a right to left orientation as viewed from a user standing at the rear of shopping cart 30. Magnetic strip 36 (shown as dotted line) is aligned parallel with and in close contact to horizontal bar 18 thereby further stabilizing board 12 when in use. The weight of board 12 causes hook 16 to be firmly engaged around vertical rod 20 thereby providing a stable platform for which to view the shopping list or make notes concerning items purchased.

Figure 5:
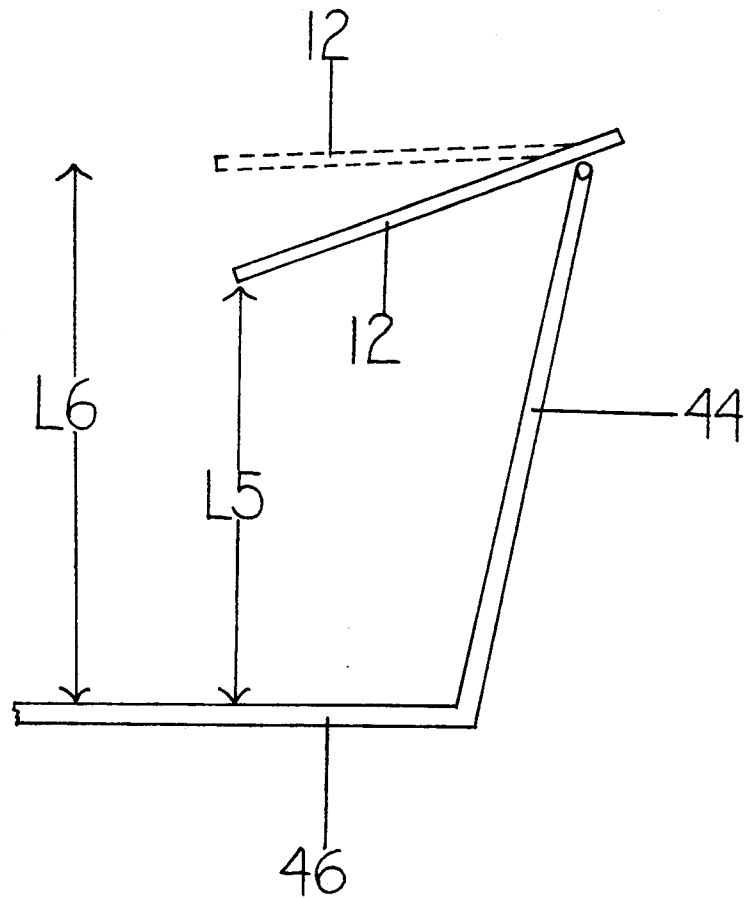
FIG. 5 illustrates a side view of the invention attached to a shopping cart depicting the two writing/reading positions.

As shown in FIG. 5, board 12 is shown fastened to front wall 46 of the child seat from a standard shopping cart. Whether board 12 is in position L5 or L6 depends merely on whether hook 16 is fastened around vertical rod 20 from right to left or from left to right. In the representative example, L5 is 5.5 inches and L6 is approximately 8.00 inches from seat 46 of the child seat.

The dimensions of the fastening mechanism can be altered to provide angles of repose ranging from nearly horizontal to approaching vertical. However, the preferred embodiment is as shown.

If shank 40 of hook 16 is increased in size to 3/32 inches, the dimensions of the fastening mechanism are increased accordingly. In this case, offset L1 is preferably ½"; L4 is preferably 1⅞ inches; L3 is ⅞ inches to yield similar angles of repose as the prior example.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A shopping list holder adapted for support on a shopping cart having at least one wall with an upper horizontal rod supported by a plurality of vertical rods, said shopping list holder comprising:

a substantially flat member of rectangular shape having top and bottom surfaces, front and rear edges;

fastener means, attached to said flat member adjacent to the front edge, for releasably attaching said flat member to only one vertical rod of said wall and for enabling said flat member to be supported on the upper horizontal bar in a position suitable for comfortably accessing a shopping list positioned on the top surface of said flat member, said fastener means further comprising:

swivel means, fastened on the top surface of said flat member, for providing a predetermined swivel point of attachment:

grabbing means, attached to said swivel means, for releasibly engaging the vertical rod wherein the weight of the flat member causes said grabbing means to be firmly urged against the vertical rod such that the rear edge of said flat member is no higher than the front edge of said flat member when resting on the upper horizontal rod, said grabbing means further comprising:

a shank having an eye end and a hook end, said eye end of the shank having an opening receiving said swivel means and being adapted to permit said grabbing means to freely swivel when attached to said swivel means, and said hook end of the shank having a radius of curvature adapted to surround the diameter of the vertical rod such that said hook end may releasably engage said vertical rod, said hook end opening which faces toward the bottom surface of said flat member when said hook end engages said vertical rod.

2. The shopping list holder of claim 1 with a bend in the shank such that when the hook portion is fastened around the vertical bar from right to left results in a different angle of repose for said flat member that when said hook portion is fastened around the vertical bar left to right thereby producing a two position platform adjustable by choosing the direction that said grabbing means is releasibly fastened to said shopping cart.

3. The shopping list holder of claim 2 wherein said grabbing means is made of metal.

4. The shopping list holder of claim 2 wherein said grabbing means is made of plastic.

5. The shopping list holder of claim 2 wherein said flat member is made from plastic.

6. The shopping list holder of claim 2 wherein said flat member is made from a wood derived product.

7. The shopping list holder of claim 2 wherein said flat member is made from metal.

8. The shopping list holder of claim 1 wherein said shopping list holder further comprises:

magnetic means, attached to the bottom surface of said flat member, for holding said shopping list holder in a selected position against a substantially vertical metal surface.

9. The shopping list holder of claim 8 wherein said magnetic means further comprises at least one strip of magnetic tape.

10. The shopping list holder of claim 9 wherein at least one strip of magnetic tape is located adjacent to the front edge of said flat member to provide additional support to keep said flat member in alignment with the horizontal bar.

11. The shopping list holder of claim 1 further comprising paper retainer means adapted for releasibly holding a shopping list.

12. The shopping list holder of claim 11 wherein said paper retainer means further comprises a spring clip.

13. The shopping list holder of claim 12 wherein said spring clip is the type found on a standard clip board and wherein swivel means is the eye of said spring clip.

14. The shopping list holder of claim 11 wherein said paper retainer means is adapted to hold a pad of papers.

* * * * *